US011044705B2

(12) United States Patent
Zhao et al.

(10) Patent No.: US 11,044,705 B2
(45) Date of Patent: Jun. 22, 2021

(54) METHOD FOR CONFIGURING UPLINK SEMI-PERSISTENT SCHEDULING, TERMINAL, AND NETWORK SIDE DEVICE

(71) Applicant: CHINA ACADEMY OF TELECOMMUNICATIONS TECHNOLOGY, Beijing (CN)

(72) Inventors: Yali Zhao, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 353 days.

(21) Appl. No.: 16/082,221

(22) PCT Filed: Jan. 22, 2017

(86) PCT No.: PCT/CN2017/072097
§ 371 (c)(1),
(2) Date: Sep. 4, 2018

(87) PCT Pub. No.: WO2017/148231
PCT Pub. Date: Sep. 8, 2017

(65) Prior Publication Data
US 2020/0296694 A1 Sep. 17, 2020

(30) Foreign Application Priority Data
Mar. 4, 2016 (CN) .......................... 201610125581.0

(51) Int. Cl.
*H04W 72/04* (2009.01)
(52) U.S. Cl.
CPC .................................... *H04W 72/04* (2013.01)
(58) Field of Classification Search
CPC ........................ H04W 72/0413; H04W 72/04
See application file for complete search history.

(56) References Cited

U.S. PATENT DOCUMENTS

2009/0280798 A1 11/2009 Meylan et al.
2013/0163494 A1* 6/2013 Yu ....................... H04W 72/042
370/311
(Continued)

FOREIGN PATENT DOCUMENTS

CN 102045861 A 5/2011
CN 104284340 A 1/2015
(Continued)

OTHER PUBLICATIONS

The Office Action for Korean Application No. 10-2018-7028668 dated Oct. 28, 2019, 5 pages.
(Continued)

*Primary Examiner* — Brian D Nguyen
(74) *Attorney, Agent, or Firm* — Womble Bond Dickinson (US) LLP

(57) ABSTRACT

Embodiments of the present application relate to the technical field of wireless communications, and in particular to a method for configuring uplink semi-persistent scheduling (SPS), a terminal, and a network side device, for use in solving the problem in the prior art of increased service delay caused by long waiting time after the arrival of a service data packet due to the fact that current uplink SPS may not match the arrival time of the service data packet. In the embodiments of the present application, a terminal sends SPS configuration auxiliary information to a network side device, so that the network side device configures uplink SPS information for the terminal according to the received SPS configuration auxiliary information. Because the terminal can send the SPS configuration auxiliary information to the network side device for the network side device to refer when performing uplink SPS configuration, the possibility of occurrence of mismatching between uplink SPS and the arrival time of a service data packet is reduced, so that the (Continued)

waiting time after the arrival of the service data packet is shortened, and the service delay is reduced.

20 Claims, 6 Drawing Sheets

(56) References Cited

U.S. PATENT DOCUMENTS

| | | | |
|---|---|---|---|
| 2014/0023008 A1 | 1/2014 | Ahn et al. | |
| 2014/0161069 A1 | 6/2014 | Ohta et al. | |
| 2015/0098341 A1* | 4/2015 | Ramkumar | H04W 24/08 370/242 |
| 2015/0282148 A1 | 10/2015 | Le | |
| 2017/0215119 A1* | 7/2017 | Hong | H04W 36/0072 |
| 2017/0276761 A1* | 9/2017 | Park | G01S 5/0236 |
| 2019/0045521 A1* | 2/2019 | Hong | H04W 72/042 |

FOREIGN PATENT DOCUMENTS

| | | |
|---|---|---|
| CN | 104936302 A | 9/2015 |
| CN | 105101428 A | 11/2015 |
| WO | 2009137647 A1 | 11/2009 |
| WO | 2013038525 A1 | 3/2013 |
| WO | 2014097357 A1 | 6/2014 |
| WO | 2015131305 A1 | 9/2015 |

OTHER PUBLICATIONS

State IP Office of PR China—International Search Report of the International Searching Authority with an English International Search Report dated Apr. 12, 2017 for International Application No. PCT/CN2017/071427 (4 pgs).
State IP Office PR China—Written Opinion of the International Searching Authority Report dated Apr. 12, 2017 for International Application No. PCT/CN2017/071427 (3 pgs).
The Office Action of Japanese Patent Application No. JP2018-546591 dated Jul. 12, 2019, 5 pages.
The Official Chinese Office Action for Application No. 201610125581.0 dated Dec. 17, 2018, 8 pages.
The Extended European Search Report for Application No. 17759082.5 dated Jan. 31, 2019, 9 pages.
ZTE, "D2D communication resource mode configuration," 3GPP TSG-RAN WG2, R2-142146, May 19-23, 2014, 5 pages, Meeting #86.

* cited by examiner

METHOD FOR CONFIGURING UPLINK SEMI-PERSISTENT SCHEDULING, TERMINAL, AND NETWORK SIDE DEVICE

CROSS-REFERENCE TO RELATED APPLICATIONS

This patent application is a U.S. National Phase application under 35 U.S.C. § 371 of International Application No. PCT/CN2017/072097, filed on 22 Jan. 2017, entitled METHOD FOR CONFIGURING UPLINK SEMI-PERSISTENT SCHEDULING, TERMINAL, AND NETWORK SIDE DEVICE, which claims priority from and claims the benefit of Chinese Patent Application No. 201610125581.0, filed with the Chinese Patent Office on Mar. 4, 2016, and entitled "A method and device for configuring uplink semi-persistent scheduling,"which the entire content of each were incorporated herein by reference.

FIELD

The present disclosure relates to the field of wireless communications, and particularly to a method, a terminal and a network side device for configuring uplink semi-persistent scheduling.

BACKGROUND

In order to reduce control signaling overhead, Semi-Persistent Scheduling (SPS) has been introduced into the Long Term Evolution (LTE) system for services characterized by substantially the same size and regular arrival of data packets.

Currently, the LTE system supports two kinds of scheduling: dynamic scheduling and SPS. Dynamic scheduling is applicable to services characterized by irregular sizes and random arrival of data packets, whereas SPS is generally applicable to services characterized by periodic arrival and a fixed size of data packets, e.g., a voice service.

For downlink SPS, a network side device can obtain downlink arrival time of service data packets, and thus can configure downlink SPS resources in a timely manner to meet a latency requirement of service data packets transmission. However, for uplink SPS, since service data is generated by a terminal, the network side device cannot obtain information about uplink arrival of the terminal's service data directly. Instead, the terminal needs to report its buffer status to the network side device via a Scheduling Request (SR)/Buffer Status Report (BSR) so that the network side device can configure an uplink SPS resource for the terminal.

Since the network side device cannot obtain from the SR/BSR an accurate time of the uplink service data's arrival, the uplink SPS resource may not match the arrival time of the uplink service data, causing a long waiting time for the uplink service data packet to be transmitted after its arrival. As such, if a short latency is required by the service, then the latency requirement of the service may not be satisfied.

In summary, in existing technologies, an uplink SPS resource may not match a corresponding service data packet's arrival time, leading to a long waiting time for the service data packet to be transmitted after the service data packet's arrival, thereby increasing latency of the service.

SUMMARY

Embodiments of the disclosure provide a method for configuring uplink SPS.

An embodiment of the disclosure provides a method for configuring uplink SPS. The method includes: determining, by a terminal, SPS configuration assistance information; and transmitting, by the terminal, the SPS configuration assistance information to a network side device, so that the network side device configures the terminal with uplink SPS information according to the received SPS configuration assistance information.

In an implementation, determining, by the terminal, the SPS configuration assistance information includes: determining, by the terminal, a part or all of following information as the SPS configuration assistance information: an uplink SPS resource start position desired by the terminal in a time domain, an uplink SPS resource configuration periodicity desired by the terminal, data packet size indication information; and, service type indication information.

In an implementation, the SPS configuration assistance information is configured to activate the SPS, and the terminal determines the SPS configuration assistance information upon determining that a service needing to use an uplink SPS resource arrives.

In an implementation, the SPS configuration assistance information is configured to update an SPS configuration, and the terminal determines the SPS configuration assistance information upon determining that a waiting latency of each of N data packets exceeds a configured latency threshold under the SPS configuration, or upon determining that a service model of a service using the uplink SPS is changed. N is a positive integer.

In an implementation, transmitting, by the terminal, the SPS configuration assistance information to the network side device includes: transmitting, by the terminal, the SPS configuration assistance information to the network side device via Radio Resource Control (RRC) signaling, Media Access Control (MAC) signaling, or physical layer signaling.

In an implementation, the method further includes: transmitting, by the terminal, SPS release instruction information to the network-side device upon determining that a service using the uplink SPS is terminated or suspended.

In an implementation, before transmitting the SPS release instruction information to the network-side device upon determining that the service using the uplink SPS is terminated or suspended, the method further includes: putting an identifier of the uplink SPS to be released by the terminal in the SPS release instruction information if the terminal has a plurality of SPS resource configurations.

In an implementation, the identifier of the uplink SPS is one or a combination of: an SPS Cell Radio Network Temporary Identifier (C-RNTI), an SPS periodicity, and an SPS configuration number.

In an implementation, after transmitting the SPS configuration assistance information to the network side device, the method further includes: determining, by the terminal, SPS configuration numbers of each SPS according to a receiving order of the uplink SPS information transmitted by the network side device; or, determining, by the terminal, SPS configuration numbers of each SPS according to the SPS configuration numbers carried in the uplink SPS information received from the network side device.

In an implementation, after transmitting the SPS configuration assistance information to the network side device, the method further includes: using, by the terminal, a parameter in the SPS configuration assistance information as an optional parameter in the uplink SPS information after receiving the uplink SPS information transmitted by the network-side device and when the optional parameter is omitted in the uplink SPS information. The used parameter in the SPS configuration assistance information and the omitted optional parameter in the uplink SPS information are parameters of a same kind.

An embodiment of the disclosure provides a method for configuring SPS. The method includes: receiving, by a network side device, SPS configuration assistance information transmitted by a terminal; and, configuring, by the network side device, the terminal with uplink SPS information according to the received SPS configuration assistance information.

In an implementation, the SPS configuration assistance information includes a part or all of following information: an uplink SPS resource start position desired by the terminal in a time domain; an uplink SPS resource configuration periodicity desired by the terminal; data packet size indication information; and, service type indication information.

In an implementation, configuring, by the network side device, the terminal with the uplink SPS information according to the received SPS configuration assistance information includes: determining, by the network side device, uplink SPS information desired by the terminal according to the received SPS configuration assistance information; and, configuring, by the network side device, the terminal with the uplink SPS information according to the uplink SPS information desired by the terminal.

In an implementation, configuring, by the network side device, the terminal with the uplink SPS information according to the uplink SPS information desired by the terminal includes: omitting, by the network side device, an optional parameter in the uplink SPS information corresponding to the terminal, where the optional parameter in the uplink SPS information corresponding to the terminal and a parameter in the uplink SPS information desired by the terminal are the same; and, configuring, by the network side device, the terminal with the uplink SPS information corresponding to the terminal after omitting the optional parameter.

In an implementation, configuring, by the network side device, the terminal with the uplink SPS information according to the uplink SPS information desired by the terminal further includes: putting, by the network side device, an SPS configuration number of SPS in the uplink SPS information corresponding to the SPS.

An embodiment of the disclosure provides a terminal for configuring uplink SPS. The terminal includes: a determining module configured to determine SPS configuration assistance information; and, a processing module configured to transmit the SPS configuration assistance information determined by the determining module to a network side device, so that the network side device configures the terminal with uplink SPS information according to the received SPS configuration assistance information.

In an implementation, the determining module is configured to determine a part or all of the following information as the SPS configuration assistance information: an uplink SPS resource start position desired by the terminal in a time domain; an uplink SPS resource configuration periodicity desired by the terminal; data packet size indication information; and, service type indication information.

In an implementation, the SPS configuration assistance information is configured to activate the SPS, and the determining module is further configured to determine the SPS configuration assistance information upon determining that a service needing to use an uplink SPS resource arrives.

In an implementation, the SPS configuration assistance information is configured to update an SPS configuration, and the determining module is further configured to determine the SPS configuration assistance information upon determining that a waiting latency of each of N data packets exceeds a configured latency threshold under the SPS configuration, or upon determining that a service model of a service using the uplink SPS is changed. N is a positive integer.

In an implementation, the processing module is configured to: transmit the SPS configuration assistance information to the network side device RRC signaling, MAC signaling, or physical layer signaling.

In an implementation, the processing module is further configured to: transmit SPS release instruction information to the network side device upon determining that a service using the uplink SPS is terminated or suspended.

In an implementation, the processing module is further configured to: put an identifier of the uplink SPS to be released by the terminal in the SPS release instruction information if the terminal has a plurality of SPS resource configurations.

In an implementation, the identifier of SPS is one or a combination of: an SPS C-RNTI, an SPS periodicity, and an SPS configuration number.

In an implementation, the processing module is further configured to: determine SPS configuration numbers of each SPS according to a receiving order of the uplink SPS information transmitted by the network side device; or, determine SPS configuration numbers of each SPS according to the SPS configuration numbers carried in the uplink SPS information received from the network side device.

In an implementation, the processing module is further configured to: use a parameter in the SPS configuration assistance information as an optional parameter in the uplink SPS information after receiving the uplink SPS information transmitted by the network-side device and when the optional parameter is omitted in the uplink SPS information, wherein the used parameter in the SPS configuration assistance information and the omitted optional parameter in the uplink SPS information are parameters of a same kind.

An embodiment of the disclosure provides a network side device for configuring uplink SPS. The network side device includes: a receiving module configured to receive SPS configuration assistance information transmitted by a terminal; and, a configuring module configured to configure the terminal with uplink SPS information according to the received SPS configuration assistance information.

In an implementation, the SPS configuration assistance information includes a part or all of following information: an uplink SPS resource start position desired by the terminal in a time domain; an uplink SPS resource configuration periodicity desired by the terminal; data packet size indication information; and, service type indication information.

In an implementation, the configuring module is configured to: determine uplink SPS information desired by the terminal according to the received SPS configuration assistance information; and, configure the terminal with the uplink SPS information according to the uplink SPS information desired by the terminal.

In an implementation, the configuring module is configured to: omit an optional parameter in the uplink SPS information corresponding to the terminal, where the omitted optional parameter in the uplink SPS information corresponding to the terminal and a parameter in the uplink SPS information desired by the terminal are the same; and, configure the terminal with the uplink SPS information corresponding to the terminal after omitting the optional parameter.

In an implementation, the configuring module is further configured to put an SPS configuration number of SPS in the uplink SPS information corresponding to the SPS.

An embodiment of the disclosure further provides a terminal. The terminal includes a processor, a memory, and a transceiver. The processor, the memory, and the transceiver are connected via a bus. The memory stores preset computer instructions. The processor is configured to read the computer instructions in the memory to: determine SPS configuration assistance information; and control the transceiver to transmit the SPS configuration assistance information to a network side device, so that the network side device configures the terminal with uplink SPS information according to the received SPS configuration assistance information. The transceiver is configured to receive and transmit data under control of the processor.

In an implementation, the processor is configured to determine a part or all of following information as the SPS configuration assistance information: an uplink SPS resource start position desired by the terminal in a time domain; an uplink SPS resource configuration periodicity desired by the terminal; data packet size indication information; and, service type indication information.

In an implementation, the SPS configuration assistance information is configured to activate the SPS, and the processor is further configured to determine the SPS configuration assistance information upon determining that a service needing to use an uplink SPS resource arrives.

In an implementation, the SPS configuration assistance information is configured to update an SPS configuration, and the processor is further configured to determine the SPS configuration assistance information upon determining that a waiting latency of each of N data packets exceeds a configured latency threshold under the SPS configuration, or upon determining that a service model of a service using the uplink SPS is changed. N is a positive integer.

In an implementation, the processor is configured to control the transceiver to transmit the SPS configuration assistance information to the network side device via RRC signaling, MAC signaling, or physical layer signaling.

In an implementation, the processor is further configured to control the transceiver to transmit SPS release instruction information to the network-side device upon determining that a service using the uplink SPS is terminated or suspended.

In an implementation, the processor is further configured to put an identifier of the uplink SPS to be released by the terminal in the SPS release instruction information if the terminal has a plurality of SPS resource configurations.

In an implementation, the identifier of the uplink SPS is one or a combination of: an SPS C-RNTI, an SPS periodicity, and an SPS configuration number.

In an implementation, the processor is further configured to: determine SPS configuration numbers of each SPS according to a receiving order of the uplink SPS information transmitted by the network side device; or, determine SPS configuration numbers of each SPS according to the SPS configuration numbers carried in the uplink SPS information received from the network side device.

In an implementation, the processor is further configured to: use a parameter in the SPS configuration assistance information as an optional parameter in the uplink SPS information after receiving the uplink SPS information transmitted by the network-side device and when the uplink SPS information the optional parameter is omitted in the uplink SPS information. The used parameter in the SPS configuration assistance information and the omitted optional parameter in the uplink SPS information are parameters of a same kind.

An embodiment of the disclosure further provides a network side device. The network side device includes a processor, a memory, and a transceiver. The processor, the memory, and the transceiver are connected via a bus. The memory stores preset computer instructions. The processor is configured to read the computer instructions in the memory to: control the transceiver to receive SPS configuration assistance information transmitted by a terminal; and configure the terminal with uplink SPS information according to the received SPS configuration assistance information. The transceiver is configured to receive and transmit data under control of the processor.

In an implementation, the SPS configuration assistance information comprises a part or all of following information: an uplink SPS resource start position desired by the terminal in a time domain; an uplink SPS resource configuration periodicity desired by the terminal; data packet size indication information; and, service type indication information.

In an implementation, the processor is configured to: determine uplink SPS information desired by the terminal according to the received SPS configuration assistance information; and, configure the terminal with the uplink SPS information according to the uplink SPS information desired by the terminal.

In an implementation, the processor is configured to: omit an optional parameter in the uplink SPS information corresponding to the terminal, where the omitted optional parameter in the uplink SPS information corresponding to the terminal and a parameter in the uplink SPS information desired by the terminal are the same; and, configure the terminal with the uplink SPS information corresponding to the terminal after omitting the optional parameter.

In an implementation, the processor is further configured to put an SPS configuration number of SPS in the uplink SPS information corresponding to the SPS.

BRIEF DESCRIPTION OF THE DRAWINGS

In order to explain the technical solutions according to the embodiments of the disclosure clearly, drawings to which a description of the embodiments refers will be briefly introduced below. Apparently the drawings to be described below are merely illustrative of some of the embodiments of the disclosure, and those skilled in the art can derive from these drawings other drawings without any inventive effort.

DETAILED DESCRIPTION OF THE EMBODIMENTS

In order to make the objects, technical solutions, and advantages of the embodiments of the disclosure clearer, the technical solutions according to the embodiments of the disclosure will be described below in detail with reference to the drawings. Apparently the embodiments described below are only a part but not all of the embodiments of the disclosure. Based upon the embodiments here of the disclosure, all other embodiments which can occur to those skilled in the art without any inventive effort shall fall into the scope of the disclosure.

Figure 1:
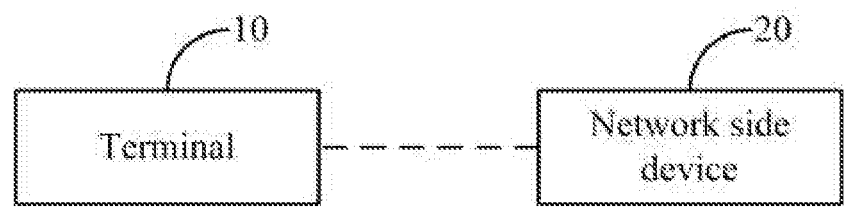
FIG. 1 is a schematic structural diagram of a system for configuring uplink SPS according to an embodiment of the disclosure.

As illustrated in FIG. 1, a system for configuring uplink SPS according to an embodiment of the disclosure includes a terminal 10 and a network side device 20.

The terminal 10 is configured to: determine SPS configuration assistance information, and transmit the SPS configuration assistance information to the network side device 20.

The network side device 20 is configured to: receive the SPS configuration assistance information transmitted by the terminal 10, and configure the terminal with uplink SPS information according to the received SPS configuration assistance information.

The SPS configuration assistance information according to the embodiments of the disclosure includes any information enabling the network side device to configure the terminal with uplink SPS information. For example, the SPS configuration assistance information can include information that enables the network side device to determine time when a service of the terminal starts.

In an implementation, the terminal determines a part or all of the following information as the SPS configuration assistance information: an uplink SPS resource start position desired by the terminal in a time domain; an uplink SPS resource configuration periodicity desired by the terminal; data packet size indication information; and, service type indication information.

Herein the uplink SPS resource start position in the time domain, which is desired by the terminal, can be any information that enables the network side device to determine an uplink SPS resource start position such as a sub-frame number, information indicating an absolute time, and etc.

The uplink SPS resource configuration periodicity desired by the terminal can consist of a single periodicity, or, can consist of multiple periodicities. If the uplink SPS resource configuration periodicity desired by the terminal consists of a single periodicity, the SPS configuration has only one periodicity, and for example, SPS resources are re-configured at a periodicity of 100 ms. If the uplink SPS resource configuration periodicity desired by the terminal consists of multiple periodicities, the SPS resources support multiple periodicities such as a 100 ms periodicity of SPS resources for transmitting small data packets, and a 500 ms periodicity of SPS resources for transmitting large data packets.

The data packet size indication information can be information indicating the number of bits in a data packet, a resource block size desired by the terminal, and etc.

The service type indication information can be information indicating a service type, and is generally used by the network side device to determine an SPS periodicity.

In an implementation, the SPS configuration assistance information is configured to activate the SPS or is configured to update the SPS configuration. Both of the two kinds of information can include a part or all of the information listed above.

The process of the network side device determining the uplink SPS information is described in examples below. It shall be noted the disclosure is not limited to the examples below. In other words, all other implementations where the uplink SPS information can be determined according to the SPS configuration assistance information are applicable to the embodiments of the disclosure.

In a first example, the SPS configuration assistance information includes service type indication information. The network side device performs one or a combination of the following operations upon obtaining the SPS configuration assistance information: determining an SPS resource periodicity, and a data packet size according to the service type; determining a frequency domain resource block size, and physical layer parameters such as a Modulation and Coding Scheme (MCS) level according the data packet size; determining an SPS resource start position in a time domain by estimating an SPS service data arrival pattern desired by the terminal according to the time when the SPS configuration assistance information is received, and according to a transmission process of signaling carrying the SPS configuration assistance information; and allocating an SPS C-RNTI for the SPS service.

In a second example, the SPS configuration assistance information includes an uplink SPS resource start position desired by the terminal in the time domain, an SPS resource periodicity desired by the terminal, and a data packet size indicator.

The network side device performs one or a combination of the following operations upon obtaining the SPS configuration assistance information: determining an SPS periodicity according to the periodicity desired by the network side device; determining a frequency domain resource block size and physical layer parameters such as an MCS level according the data packet size; determining an SPS resource start position in the time domain according to the uplink SPS resource start position desired by the terminal in the time domain; and allocating an SPS C-RNTI for the SPS service.

In a third example, the SPS configuration assistance information includes an uplink SPS resource start position desired by the terminal in the time domain, and service type indication information.

The network side device performs one or a combination of the following operations upon obtaining the SPS configuration assistance information: determining an SPS resource periodicity and a data packet size according to the service type; determining a frequency domain resource block size and physical layer parameters such as an MCS level according the data packet size; determining an SPS resource start position in the time domain according to the uplink SPS resource start position in the time domain which is desired by the terminal; and allocating an SPS C-RNTI for the SPS service.

If the SPS configuration assistance information is configured to activate the SPS, then the terminal determines the SPS configuration assistance information upon determining that a service needing to use an uplink SPS resource arrives.

In an implementation, the terminal can determine that the service needing to use the uplink SPS resource (i.e., an uplink service having SPS characteristics) arrives as follows: a service layer makes the determination directly, and indicates it to a lower layer through interaction between the layers; or the service layer indicates service characteristic(s) (e.g., a periodicity and/or a data packet size) or a service type of a data packet to be transmitted, to a lower layer, and the lower layer makes the determination itself. The lower layer can be an RRC layer, an MAC layer, or a physical layer.

If the SPS configuration assistance information is configured to update an SPS configuration, then the terminal determines the SPS configuration assistance information upon determining that a waiting latency of each of N data packets exceeds a configured latency threshold under the SPS configuration, where N is a positive integer, or, upon determining that a service model of the service using the uplink SPS is changed (e.g., from a Cooperative Awareness Message (CAM) to a Decentralized Environmental Notification Message (DENM)).

For example, if N is 5, then the terminal determines the SPS configuration assistance information as long as a total waiting latency of five data packets exceeds the configured latency threshold.

In an implementation, the terminal transmits the SPS configuration assistance information to the network side device via RRC signaling, MAC signaling, or physical layer signaling.

Apart from the three kinds of signaling above, all other signaling through which the SPS configuration assistance information can be transmitted to the network side device are applicable to the embodiments of the disclosure.

In the embodiment of the disclosure, in addition to the SPS configuration assistance information above, the terminal can further transmit SPS release instruction information to the network side device.

In an implementation, the terminal transmits the SPS release instruction information to the network side device upon determining that the service using the uplink SPS is terminated or suspended.

In other words, the terminal is triggered to transmit the SPS release instruction information to the network side device when the service using the uplink SPS is terminated or suspended.

If the terminal has only one SPS resource configuration, then the existing SPS release mechanism (specified by the 3GPP TS 36.321) may be used, and a repeated description thereof is omitted herein.

If the terminal has a plurality of SPS resource configurations, then terminal puts the identifier of the SPS to be released in the SPS release instruction information.

Herein the identifier of the SPS can be information which uniquely identifies the SPS to be released, e.g., an SPS C-RNTI, an SPS periodicity, an SPS configuration number, and etc.

Herein if the identifier of the SPS is an SPS periodicity, then a plurality of configured SPS periodicities must be different, or all the SPS configurations having a same SPS periodicity shall be released.

In an implementation, the terminal can further determine SPS configuration numbers of each SPS according to a receiving order of the uplink SPS information transmitted by the network side device, after transmitting the SPS configuration assistance information to the network side device.

For example, if the terminal receives uplink SPS information A first, then the terminal determines an SPS configuration number of an SPS corresponding to the uplink SPS information A to be 1. If the terminal receives uplink SPS information B next, then the terminal determines an SPS configuration number of an SPS corresponding to the uplink SPS information B to be 2, and so on.

In an implementation, the terminal can determine SPS configuration numbers of each SPS according to the SPS configuration numbers carried in the uplink SPS information received from the network side device.

Correspondingly, the network side device puts an SPS configuration number of an SPS in uplink SPS information corresponding to the SPS.

In an implementation, the terminal transmits the SPS release instruction information to the network side device via RRC signaling, MAC signaling, or physical layer signaling.

Apart from the three kinds of signaling above, all other signaling through which the SPS release instruction information can be transmitted to the network side device are applicable to the embodiments of the disclosure.

Upon reception of the SPS release instruction information, the network side device can determine uplink SPS information desired by the terminal according to the received SPS configuration assistance information, and configure the terminal with uplink SPS information according to the uplink SPS information desired by the terminal.

In other words, the network side device allocates an uplink SPS resource according to the SPS configuration assistance information reported by the terminal by following an instruction in the SPS configuration assistance information of the terminal as much as possible.

If the instruction in the SPS configuration assistance information reported by the terminal cannot be followed due to factors such as interference or overhead, then the network side device may make adjustments by itself. For example, the allocated uplink SPS resource can be delayed by M (M≥1, and M is an integer) ms in the time domain.

In an implementation, the network side device notifies the terminal of the determined uplink SPS information by using uplink SPS information in the existing LTE system as the uplink SPS information.

In an implementation, the network side device can optimize the uplink SPS information. That is, if the uplink SPS information of the network side device and the uplink SPS information desired by the terminal and reported by the terminal have a same part, then this part of the information may be omitted in the uplink SPS information transmitted by the network side device.

In an implementation, the network side device omits an optional parameter in the uplink SPS information corresponding to the terminal, and configures the terminal with the uplink SPS information corresponding to the terminal after omitting the optional parameter. The omitted optional parameter in the uplink SPS information corresponding to the terminal and a parameter in the uplink SPS information desired by the terminal are the same.

Correspondingly, after receiving the uplink SPS information transmitted by the network-side device, if the optional parameter is omitted in the uplink SPS information, the terminal uses the parameter, which is a same kind of parameter as the omitted optional parameter, in the SPS configuration assistance information as the optional parameter in the uplink SPS information. Reference can be made to the 3GPP TS 36.321 protocol for details of parameters in the uplink SPS information, so a repeated description thereof is omitted herein.

The network side device according to the embodiments of the disclosure can be a base station (e.g., a macro base station (including an evolved base station), a home base station, and etc.), or can be a Relay Node (RN) device, or can be another kind of network side device.

Figure 2:
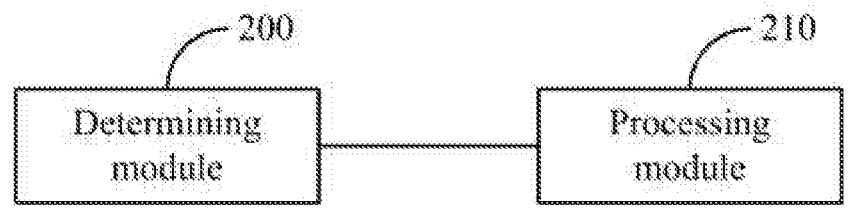
FIG. 2 is a schematic structural diagram of a first terminal according to an embodiment of the disclosure.

As illustrated by FIG. 2, a first terminal according to an embodiment of the disclosure includes a determining module 200 and a processing module 210.

The determining module 200 is configured to determine SPS configuration assistance information.

The processing module 210 is configured to transmit the SPS configuration assistance information determined by the determining module to a network side device, so that the network side device configures the terminal with uplink SPS information according to the received SPS configuration assistance information.

In an implementation, the determining module 200 is configured to determine a part or all of the following information as the SPS configuration assistance information: an uplink SPS resource start position desired by the terminal in a time domain; an uplink SPS resource configuration periodicity desired by the terminal; data packet size indication information; and, service type indication information.

In an implementation, the SPS configuration assistance information is configured to activate the SPS, and the determining module is further configured to determine the SPS configuration assistance information upon determining that a service needing to use an uplink SPS resource arrives.

In an implementation, the SPS configuration assistance information is configured to update an SPS configuration, and the determining module is further configured to determine the SPS configuration assistance information upon determining that a waiting latency of each of N data packets exceeds a configured latency threshold under the SPS configuration, or upon determining that a service model of a service using the uplink SPS is changed. N is a positive integer.

In an implementation, the processing module 210 is configured to transmit the SPS configuration assistance information to the network side device RRC signaling, MAC signaling, or physical layer signaling.

In an implementation, the processing module 210 is further configured to transmit SPS release instruction information to the network side device upon determining that a service using the uplink SPS is terminated or suspended.

In an implementation, the processing module 210 is further configured to put an identifier of the uplink SPS to be released by the terminal in the SPS release instruction information if the terminal has a plurality of SPS resource configurations.

In an implementation, the identifier of SPS is one or a combination of an SPS Cell C-RNTI, an SPS periodicity, and an SPS configuration number.

In an implementation, the processing module 210 is further configured to: determine SPS configuration numbers of each SPS according to a receiving order of the uplink SPS information transmitted by the network side device; or, determine SPS configuration numbers of each SPS according to the SPS configuration numbers carried in the uplink SPS information received from the network side device.

In an implementation, the processing module 210 is further configured to: use a parameter in the SPS configuration assistance information as an optional parameter in the uplink SPS information after receiving the uplink SPS information transmitted by the network-side device and when the optional parameter is omitted in the uplink SPS information. The used parameter in the SPS configuration assistance information and the omitted optional parameter in the uplink SPS information are parameters of a same kind.

Figure 3:
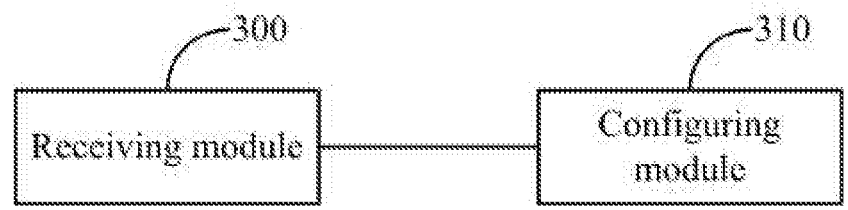
FIG. 3 is a schematic structural diagram of a first network side device according to an embodiment of the disclosure.

As illustrated by FIG. 3, a first network side device according to an embodiment of the disclosure includes a receiving module 300 and a configuring module 310.

The receiving module 300 is configured to receive SPS configuration assistance information transmitted by a terminal.

The configuring module 310 is configured to configure the terminal with uplink SPS information according to the received SPS configuration assistance information.

In an implementation, the SPS configuration assistance information includes a part or all of following information: an uplink SPS resource start position desired by the terminal in a time domain; an uplink SPS resource configuration periodicity desired by the terminal; data packet size indication information; and, service type indication information.

In an implementation, the configuring module 310 is configured to: determine uplink SPS information desired by the terminal according to the received SPS configuration assistance information; and, configure the terminal with the uplink SPS information according to the uplink SPS information desired by the terminal.

In an implementation, the configuring module 310 is configured to: omit an optional parameter in the uplink SPS information corresponding to the terminal, where the omitted optional parameter in the uplink SPS information corresponding to the terminal and a parameter in the uplink SPS information desired by the terminal are the same; and, configure the terminal with the uplink SPS information corresponding to the terminal after omitting the optional parameter.

In an implementation, the configuring module 310 is further configured to put an SPS configuration number of SPS in the uplink SPS information corresponding to the SPS.

Figure 4:
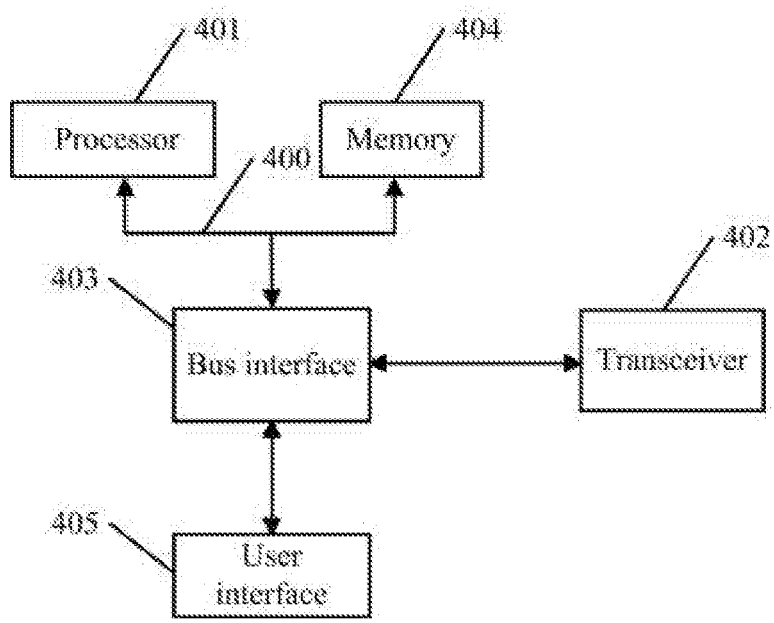
FIG. 4 is a schematic structural diagram of a second terminal according to an embodiment of the disclosure.

As illustrated by FIG. 4, a second terminal according to an embodiment of the disclosure includes a processor 401 configured to read computer instructions in a memory 404 to: determine SPS configuration assistance information; and control a transceiver 402 to transmit the SPS configuration assistance information to a network side device, so that the network side device configures the terminal with uplink SPS information according to the received SPS configuration assistance information. The second terminal includes the transceiver 402 and the transceiver is configured to receive and transmit data under control of the processor 401.

In an implementation, the processor 401 is configured to determine a part or all of following information as the SPS configuration assistance information: an uplink SPS resource start position desired by the terminal in a time domain; an uplink SPS resource configuration periodicity desired by the terminal; data packet size indication information; and, service type indication information.

In an implementation, the SPS configuration assistance information is configured to activate the SPS, and the processor 401 is further configured to determine the SPS configuration assistance information upon determining that a service needing to use an uplink SPS resource arrives.

In an implementation, the SPS configuration assistance information is configured to update an SPS configuration, and the processor 401 is further configured to determine the SPS configuration assistance information upon determining that a waiting latency of each of N data packets exceeds a configured latency threshold under the SPS configuration, or upon determining that a service model of a service using the uplink SPS is changed. N is a positive integer.

In an implementation, the processor 401 is configured to control the transceiver 402 to transmit the SPS configuration assistance information to the network side device via RRC signaling, MAC signaling, or physical layer signaling.

In an implementation, the processor 401 is further configured to control the transceiver 402 to transmit SPS release instruction information to the network-side device upon determining that a service using the uplink SPS is terminated or suspended.

In an implementation, the processor 401 is further configured to put an identifier of the uplink SPS to be released by the terminal in the SPS release instruction information if the terminal has a plurality of SPS resource configurations.

In an implementation, the identifier of the uplink SPS is one or a combination of: an SPS C-RNTI, an SPS periodicity, and an SPS configuration number.

In an implementation, the processor 401 is further configured to: determine SPS configuration numbers of each SPS according to a receiving order of the uplink SPS information transmitted by the network side device; or, determine SPS configuration numbers of each SPS according to the SPS configuration numbers carried in the uplink SPS information received from the network side device.

In an implementation, the processor 401 is further configured to: use a parameter in the SPS configuration assistance information as an optional parameter in the uplink SPS information after receiving the uplink SPS information transmitted by the network-side device and when the optional parameter is omitted in the uplink SPS information.

In FIG. 4, the bus architecture is represented by a bus 400. The bus 400 can include any number of interconnecting buses and bridges to link together various circuits including one or more processors represented by the processor 401, and one or more memories represented by the memory 404. The bus 400 can further link together various other circuits, e.g., a peripheral device, a manostat, a power management circuit, etc., all of which are well known in the art, so a further description thereof will be omitted in this context. A bus interface 403 serves as an interface between the bus 400 and the transceiver 402. The transceiver 402 can be an element, or a number of elements, e.g., a number of transmitters and receivers, which are units for communication with various other devices over a transmission medium. For example, the transceiver 402 receives external data from another device. The transceiver 402 is configured to transmit data processed by the processor 401 to the other device. A user interface 405, e.g., a keypad, a display, a loudspeaker, a microphone, a joystick, etc., can be further provided dependent upon the nature of a computing system.

The processor 401 is responsible for managing the bus 400 and performing normal processes, e.g., running a general operating system as described above. The memory 404 can store data for use by the processor 401 in performing the operations.

In an implementation, the processor 401 can be a Central Processing Unit (CPU), an Application Specific Integrated Circuit (ASIC), a Field-Programmable Gate Array (FPGA), or a Complex Programmable Logic Device (CPLD).

Figure 5:
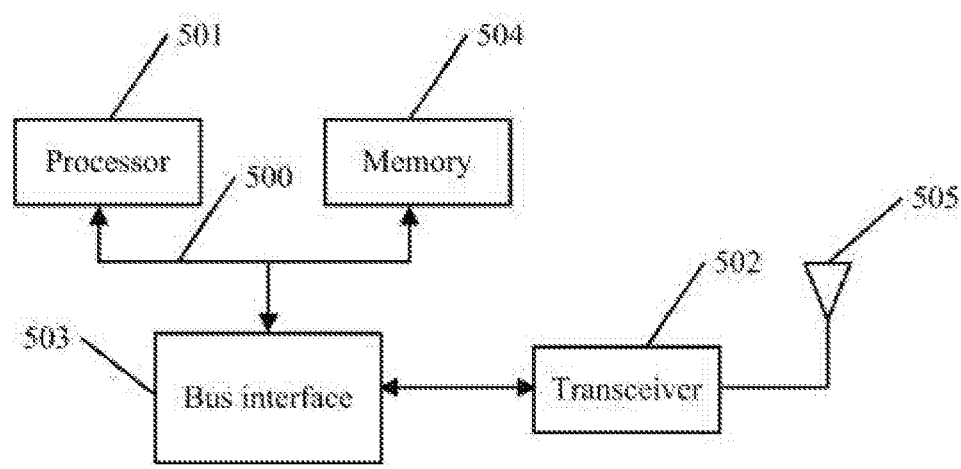
FIG. 5 is a schematic structural diagram of a second network side device according to an embodiment of the disclosure.

As illustrated in FIG. 5, a second network side device according to an embodiment of the disclosure includes a processor 501 configured to read computer instructions in a memory 504 to: control the transceiver to receive SPS configuration assistance information transmitted by a terminal; and configure the terminal with uplink SPS information according to the received SPS configuration assistance information. The second network side device includes the transceiver 502 and the transceiver 502 is configured to receive and transmit data under the control of the processor 501.

In an implementation, the SPS configuration assistance information comprises a part or all of following information: an uplink SPS resource start position desired by the terminal in a time domain; an uplink SPS resource configuration periodicity desired by the terminal; data packet size indication information; and, service type indication information.

In an implementation, the processor 501 is configured to: determine uplink SPS information desired by the terminal according to the received SPS configuration assistance information; and, configure the terminal with the uplink SPS information according to the uplink SPS information desired by the terminal.

In an implementation, the processor 501 is configured to: omit an optional parameter in the uplink SPS information corresponding to the terminal, where the omitted optional parameter in the uplink SPS information corresponding to the terminal and a parameter in the uplink SPS information desired by the terminal are the same; and, configure the terminal with the uplink SPS information corresponding to the terminal after omitting the optional parameter.

In an implementation, the processor 501 is further configured to put an SPS configuration number of SPS in the uplink SPS information corresponding to the SPS.

In FIG. 5, in a bus architecture (represented by a bus 500), the bus 500 can include any number of interconnecting buses and bridges to particularly link together various circuits including one or more processors represented by the processor 501, and one or more memories represented by the memory 504. The bus 500 can further link together various other circuits, e.g., prophetical devices, manostats, power management circuits, etc., all of which are well known in the art, so a further description thereof will be omitted in this context. A bus interface 503 serves as an interface between the bus 500 and the transceiver 502. The transceiver 502 can be an element, or a number of elements, e.g., a number of transmitters and receivers, which are units for communication with various other devices over a transmission medium. Data processed by the processor 501 are transmitted over a wireless medium through an antenna 505, and furthermore data are received by and conveyed through the antenna 505 to the processor 501.

The processor 501 is responsible for managing the bus 500 and performing normal processes, and can further provide various functions including timing, a peripheral interface, voltage regulation, power supply management, and other control functions. The memory 504 can store data for use by the processor 501 in performing the operations.

In an implementation, the processor 501 can be a CPU, an ASIC, an FPGA, or a CPLD.

Based upon the same inventive idea, an embodiment of the disclosure further provides a method for configuring uplink SPS. Since the method addresses the problem under a similar principle to the system for configuring uplink semi-persistent scheduling described above, reference can be made to the implementation of the system for an implementation of the method, and a repeated description thereof is omitted here.

Figure 6:
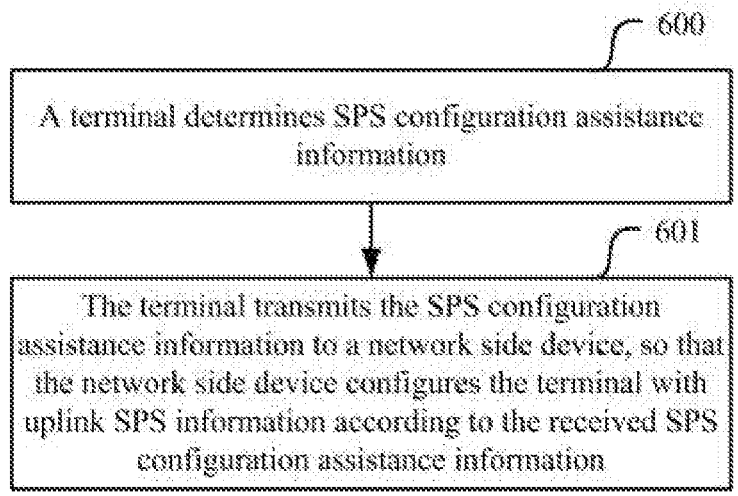
FIG. 6 is a schematic flow chart of a first method for configuring uplink SPS according to an embodiment of the disclosure.

As illustrated by FIG. 6, a first method for configuring uplink semi-persistent scheduling according to an embodiment of the disclosure includes operation 600 and operation 601.

At the operation 600, a terminal determines SPS configuration assistance information.

At the operation 601, the terminal transmits the SPS configuration assistance information to a network side device, so that the network side device configures the terminal with uplink SPS information according to the received SPS configuration assistance information.

In an implementation, determining, by the terminal, the SPS configuration assistance information includes: determining, by the terminal, a part or all of following information as the SPS configuration assistance information: an uplink SPS resource start position desired by the terminal in a time domain, an uplink SPS resource configuration periodicity desired by the terminal, data packet size indication information; and, service type indication information.

In an implementation, the SPS configuration assistance information is configured to activate the SPS, and the terminal determines the SPS configuration assistance information upon determining that a service needing to use an uplink SPS resource arrives.

In an implementation, the SPS configuration assistance information is configured to update an SPS configuration, and the terminal determines the SPS configuration assistance information upon determining that a waiting latency of each of N data packets exceeds a configured latency threshold under the SPS configuration, or upon determining that a service model of a service using the uplink SPS is changed. N is a positive integer.

In an implementation, transmitting, by the terminal, the SPS configuration assistance information to the network side device includes: transmitting, by the terminal, the SPS configuration assistance information to the network side device via RRC signaling, MAC signaling, or physical layer signaling.

In an implementation, the method further includes: transmitting, by the terminal, SPS release instruction information to the network-side device upon determining that a service using the uplink SPS is terminated or suspended.

In an implementation, before transmitting the SPS release instruction information to the network-side device upon determining that the service using the uplink SPS is terminated or suspended, the method further includes: putting an identifier of the uplink SPS to be released by the terminal in the SPS release instruction information if the terminal has a plurality of SPS resource configurations.

In an implementation, the identifier of the uplink SPS is one or a combination of: an SPS C-RNTI, an SPS periodicity, and an SPS configuration number.

In an implementation, after transmitting the SPS configuration assistance information to the network side device, the method further includes: determining, by the terminal, SPS configuration numbers of each SPS according to a receiving order of the uplink SPS information transmitted by the network side device; or, determining, by the terminal, SPS configuration numbers of each SPS according to the SPS configuration numbers carried in the uplink SPS information received from the network side device.

In an implementation, after transmitting the SPS configuration assistance information to the network side device, the method further includes: using, by the terminal, a parameter in the SPS configuration assistance information as an optional parameter in the uplink SPS information after receiving the uplink SPS information transmitted by the network-side device and when the optional parameter is omitted in the uplink SPS information. The used parameter in the SPS configuration assistance information and the omitted optional parameter in the uplink SPS information are parameters of a same kind.

Figure 7:
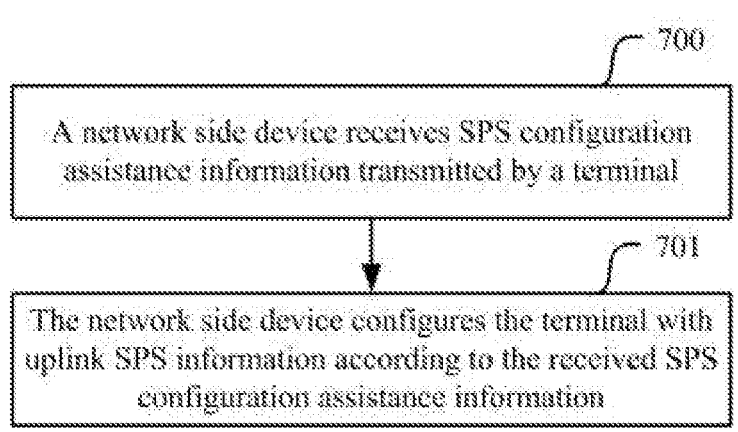
FIG. 7 is a schematic flow chart of a second method for configuring uplink SPS according to an embodiment of the disclosure.

As illustrated by FIG. 7, a second method for configuring uplink SPS according to an embodiment of the disclosure includes an operation 700 and an operation 701.

At the operation 700, a network side device receives SPS configuration assistance information transmitted by a terminal.

At the operation 701, the network side device configures the terminal with uplink SPS information according to the received SPS configuration assistance information.

In an implementation, the SPS configuration assistance information includes a part or all of following information: an uplink SPS resource start position desired by the terminal in a time domain; an uplink SPS resource configuration periodicity desired by the terminal; data packet size indication information; and, service type indication information.

In an implementation, configuring, by the network side device, the terminal with the uplink SPS information according to the received SPS configuration assistance information includes: determining, by the network side device, uplink SPS information desired by the terminal according to the received SPS configuration assistance information; and, configuring, by the network side device, the terminal with the uplink SPS information according to the uplink SPS information desired by the terminal.

In an implementation, configuring, by the network side device, the terminal with the uplink SPS information according to the uplink SPS information desired by the terminal includes: omitting, by the network side device, an optional parameter in the uplink SPS information corresponding to the terminal, where the omitted optional parameter in the uplink SPS information corresponding to the terminal and a parameter in the uplink SPS information desired by the terminal are the same; and, configuring, by the network side device, the terminal with the uplink SPS information corresponding to the terminal after omitting the optional parameter.

In an implementation, configuring, by the network side device, the terminal with the uplink SPS information according to the uplink SPS information desired by the terminal further includes: putting, by the network side device, an SPS configuration number of SPS in the uplink SPS information corresponding to the SPS.

The solutions according to the embodiments of the disclosure will be described below in details by way of several examples.

Figure 8:
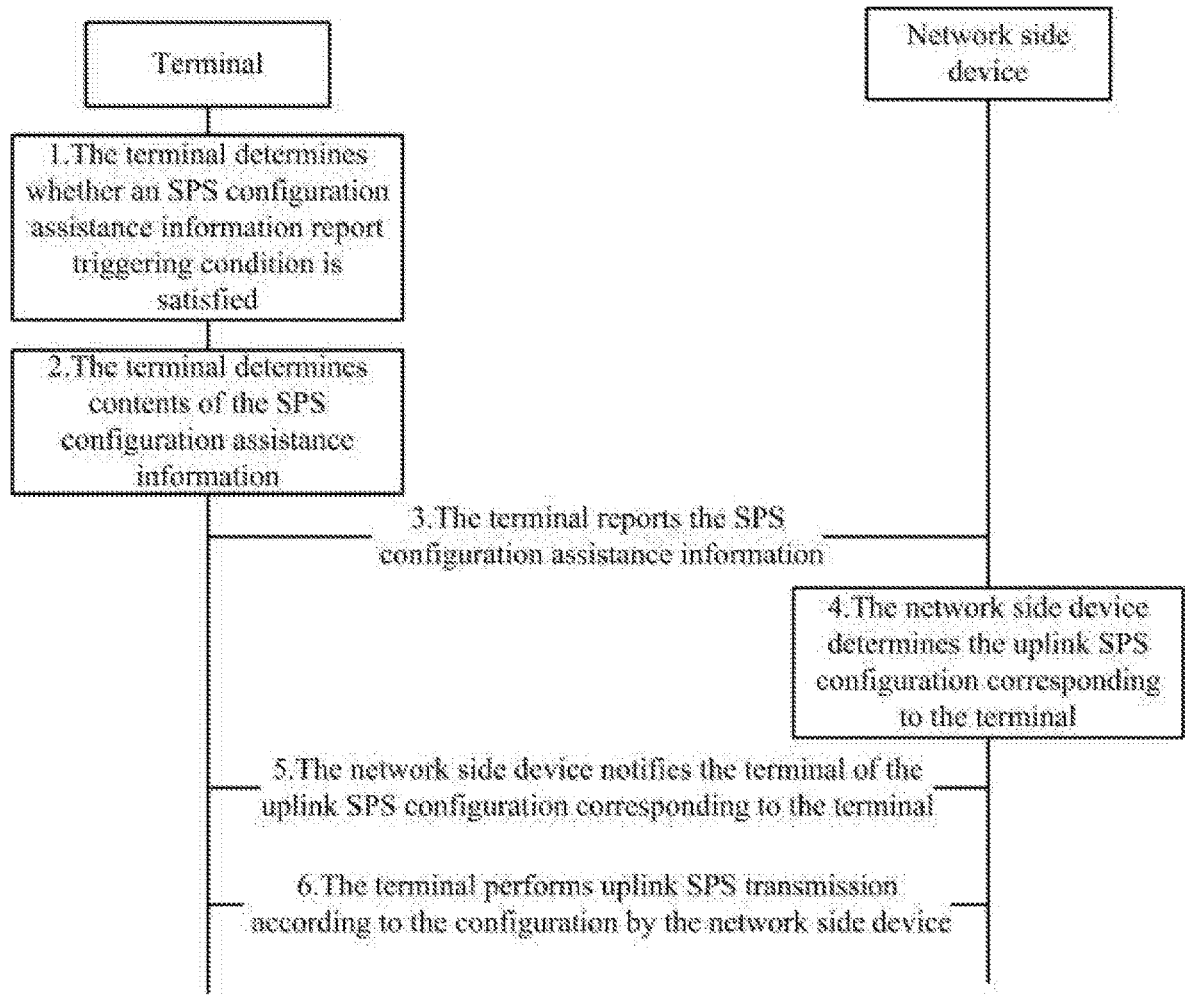
FIG. 8 is a schematic flow chart of a method for a network side device to activate an SPS configuration according to SPS configuration assistance information reported by a terminal according to an embodiment of the disclosure.

As illustrated by FIG. 8, the network side device activates an SPS configuration according to the SPS configuration assistance information reported by the terminal as follows according to an embodiment of the disclosure.

Operation 1: the terminal determines whether an SPS configuration assistance information report triggering condition is satisfied.

The SPS configuration assistance information report triggering condition for SPS activation is: the UE (i.e., the terminal) determines an uplink service having SPS characteristics arrives. The UE can determine that that the uplink service having SPS characteristics arrives by a service layer making the determination directly, and indicates it to a lower layer through interaction between the layers, or by the service layer indicating service characteristics (periodicity and/or data packet size) or service type of data packets to be transmitted, to the lower layer, and the lower layer making the determination by itself. The lower layer can be an RRC layer, an MAC layer, or a physical layer.

Operation 2: the terminal determines contents of the SPS configuration assistance information.

The terminal determines the contents of the SPS configuration assistance information according to indication information of the service layer. In an implementation, the contents determined by the terminal include one or more of the following items: an uplink SPS resource start position in a time domain (which can have different forms such as a frame number or absolute time indication information) desired by the terminal; an uplink SPS resource configuration periodicity (which may consist of a single periodicity or multiple periodicities) desired by the terminal; data packet size indication information (which may be the number of bits in a data packet or a resource block size desired by the terminal) and service type indication information.

Operation 3: the terminal reports the SPS configuration assistance information.

The terminal can report the SPS configuration assistance information to the network side device via RRC signaling, MAC signaling, or physical layer signaling.

Operation 4: the network side device determines the uplink SPS configuration corresponding to the terminal.

The network side device determines the uplink SPS configuration corresponding to the terminal according to the SPS configuration assistance information reported by the terminal. The process of the network side device determining the uplink SPS configuration is exemplified as follows, although other algorithms will also be applicable to the embodiments of the disclosure.

In a first example, the SPS configuration assistance information reported by the terminal at operation 3 includes only service type indication information such as a CAM message, a DENM message, or a BSM. The network side device performs one or a combination of the following operations upon obtaining the SPS configuration assistance information: determining an SPS resource periodicity and a data packet size according to the service type; determining a frequency-domain resource block size and a physical layer parameter such as an MCS level according the data packet size; determining an SPS resource start position in a time domain by estimating an SPS service data arrival pattern desired by the terminal according to the time when the SPS configuration assistance information is received, and according to a transmission process of signaling carrying the SPS configuration assistance information; and allocating an SPS C-RNTI for the SPS service.

In a second example, the SPS configuration assistance information reported by the terminal at operation 3 includes an uplink SPS resource start position desired by the terminal in a time domain (which may be indicated by a System Frame Number (SFN) index and by a subframe index, or may be an absolute time), an SPS resource periodicity desired by the terminal and a data packet size indicator (the number of bits in a data packet).

The network side device performs one or a combination of the following operations upon obtaining the SPS configuration assistance information: determining a frequency domain resource block size and physical layer parameters such as an MCS level according the data packet size; determining an SPS resource start position in the time domain according to the uplink SPS resource start position desired by the terminal in the time domain; and allocating an SPS C-RNTI for the SPS service.

In a third example, the SPS configuration assistance information reported by the terminal at operation 3 includes an uplink SPS resource start position desired by the terminal in the time domain, and service type indication information.

The network side device performs one or a combination of the following operations upon obtaining the SPS configuration assistance information: determining an SPS resource periodicity and a data packet size according to the service type; determining a frequency domain resource block size and physical layer parameters such as an MCS level according the data packet size; determining an SPS resource start position in the time domain according to the uplink SPS resource start position in the time domain which is desired by the terminal; and allocating an SPS C-RNTI for the SPS service.

Operation 5: the network side device notifies the terminal of the uplink SPS configuration corresponding to the terminal.

The network side device notifies the terminal of the determined uplink SPS information. The determined uplink SPS information can be uplink SPS information in the existing LTE system, or can be obtained by optimizing the uplink SPS information in the existing LTE system, that is, if the uplink SPS information of the network side device and the uplink SPS information desired by the terminal and reported by the terminal have a same part, then this part of the information may be omitted in the uplink SPS information transmitted by the network side device.

Operation 6: the terminal performs uplink SPS transmission according to the configuration by the network side device.

After the terminal receives the uplink SPS information transmitted by the network side device, if a part of parameters in the uplink SPS information are omitted, then the terminal automatically uses parameter values in the reported uplink SPS configuration desired by the terminal as the omitted parameters. Then the terminal performs SPS transmission over an SPS resource configured by the network side device.

Figure 9:
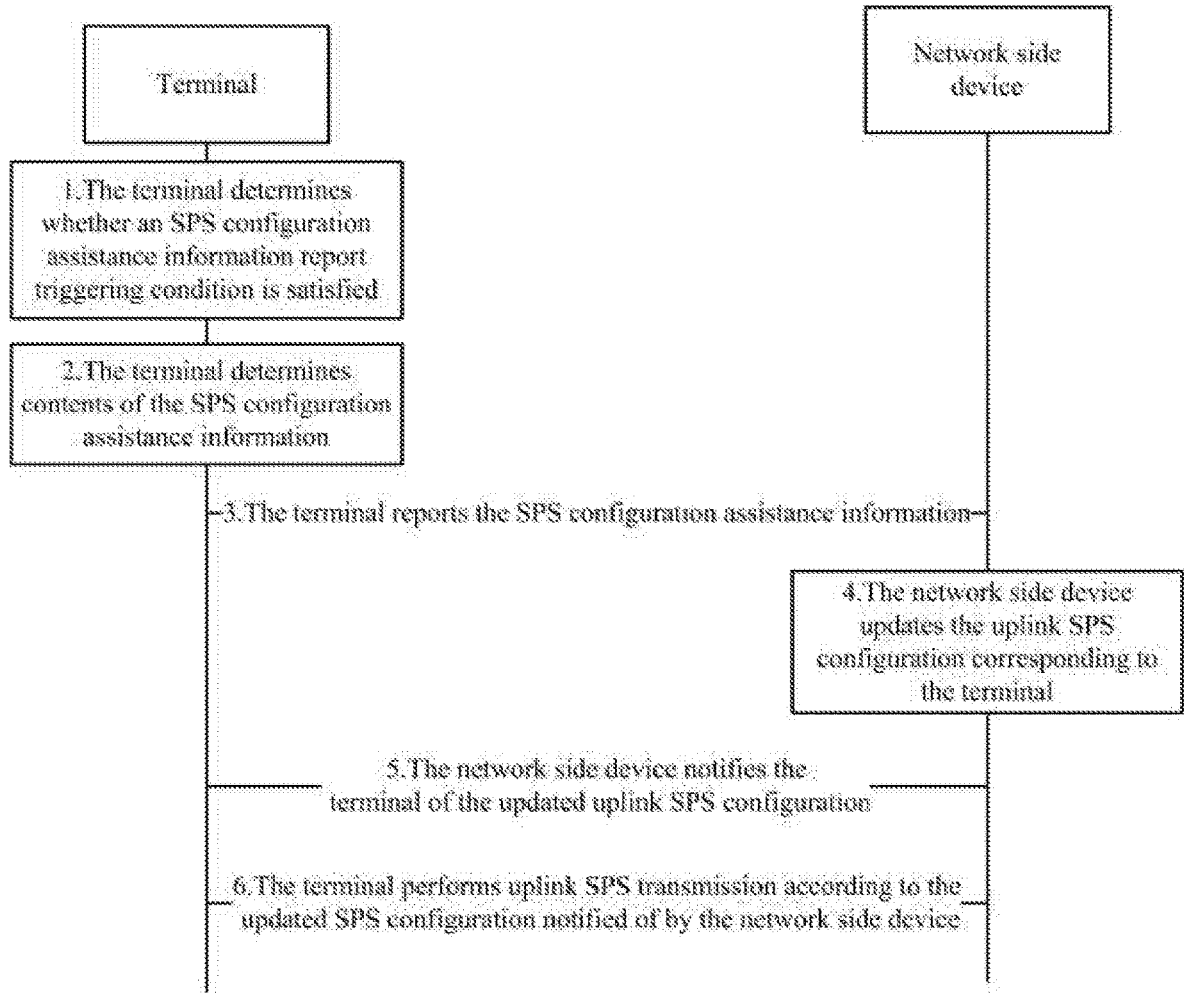
FIG. 9 is a schematic flow chart of a method for a network side device to update an SPS configuration according to SPS configuration assistance information reported by a terminal according to an embodiment of the disclosure.

As illustrated by FIG. 9, the network side device updates an SPS configuration according to the SPS configuration assistance information reported by the terminal as follows according to an embodiment of the disclosure.

Operation 1: the terminal determines whether an SPS configuration assistance information report triggering condition is satisfied.

The SPS configuration assistance information report triggering condition for updating the SPS configuration is that a waiting latency of each of N data packets exceeds a configured latency threshold under a SPS configuration (N is a positive integer), or that a service model of the service using the uplink SPS is changed (e.g., the periodicity or the data packet size is changed).

Operation 2: the terminal determines contents of the SPS configuration assistance information.

The terminal determines the contents of the SPS configuration assistance information according to indication information of the service layer. In an implementation, the contents determined by the terminal include one or more of the following items: an uplink SPS resource start position in a time domain (which can have different forms such as a frame number or absolute time indication information) desired by the terminal; an uplink SPS resource configuration periodicity (which may consist of a single periodicity or multiple periodicities) desired by the terminal; data packet size indication information (which may be the number of bits in a data packet or a resource block size desired by the terminal) and service type indication information.

Operation 3: the terminal reports the SPS configuration assistance information.

The terminal can report the SPS configuration assistance information to the network side device via RRC signaling, MAC signaling, or physical layer signaling.

Operation 4: the network side device updates the uplink SPS configuration corresponding to the terminal.

The network side device updates the uplink SPS configuration corresponding to the terminal according to the SPS configuration assistance information reported by the terminal. The process of the network side device determining the new uplink SPS configuration is exemplified as follows, although other algorithms will also be applicable to the embodiments of the disclosure.

In a first example, the SPS configuration assistance information reported by the terminal at operation 3 includes only information indicating the service model or service type indication information such as a CAM message, a DENM message, or a BSM. The network side device performs one or a combination of the following operations upon obtaining the SPS configuration assistance information: determining an SPS resource periodicity and a data packet size according to the service type; determining a frequency-domain resource block size and a physical layer parameter such as an MCS level according the data packet size; determining an SPS resource start position in a time domain by estimating an SPS service data arrival pattern desired by the terminal according to the time when the SPS configuration assistance information is received, and according to a transmission process of signaling carrying the SPS configuration assistance information; and allocating an SPS C-RNTI for the SPS service.

In a second example, the SPS configuration assistance information reported by the terminal at operation 3 includes an uplink SPS resource start position desired by the terminal in a time domain (which may be indicated by an SFN index and by a subframe index, or may be an absolute time), an SPS resource periodicity desired by the terminal and a data packet size indicator (the number of bits in a data packet).

The network side device performs one or a combination of the following operations upon obtaining the SPS configuration assistance information: determining a frequency domain resource block size and physical layer parameters such as an MCS level according the data packet size; determining an SPS resource start position in the time domain according to the uplink SPS resource start position desired by the terminal in the time domain; and allocating an SPS C-RNTI for the SPS service.

In a third example, the SPS configuration assistance information reported by the terminal at operation 3 includes an uplink SPS resource start position desired by the terminal in the time domain, and service type indication information.

The network side device performs one or a combination of the following operations upon obtaining the SPS configuration assistance information: determining an SPS resource periodicity and a data packet size according to the service type; determining a frequency domain resource block size and physical layer parameters such as an MCS level according the data packet size; determining an SPS resource start position in the time domain according to the uplink SPS resource start position in the time domain which is desired by the terminal; and allocating an SPS C-RNTI for the SPS service.

Operation 5: the network side device notifies the terminal of the updated uplink SPS configuration.

The network side device notifies the terminal of the updated uplink SPS information. The uplink SPS information can be uplink SPS information in the existing LTE system, or can be obtained by optimizing the uplink SPS information in the existing LTE system, that is, if the uplink SPS information of the network side device and the uplink SPS information desired by the terminal and reported by the terminal have a same part, then this part of the information may be omitted in the uplink SPS information transmitted by the network side device.

Operation 6: the terminal performs uplink SPS transmission according to the updated SPS configuration notified of by the network side device.

After the terminal receives the updated uplink SPS information transmitted by the network side device, the terminal releases the old SPS configuration and uses the new SPS configuration for uplink SPS transmission. If a part of parameters in the updated uplink SPS information are omitted, then the terminal automatically uses parameter values in the reported uplink SPS configuration desired by the terminal as the omitted parameters.

Figure 10:
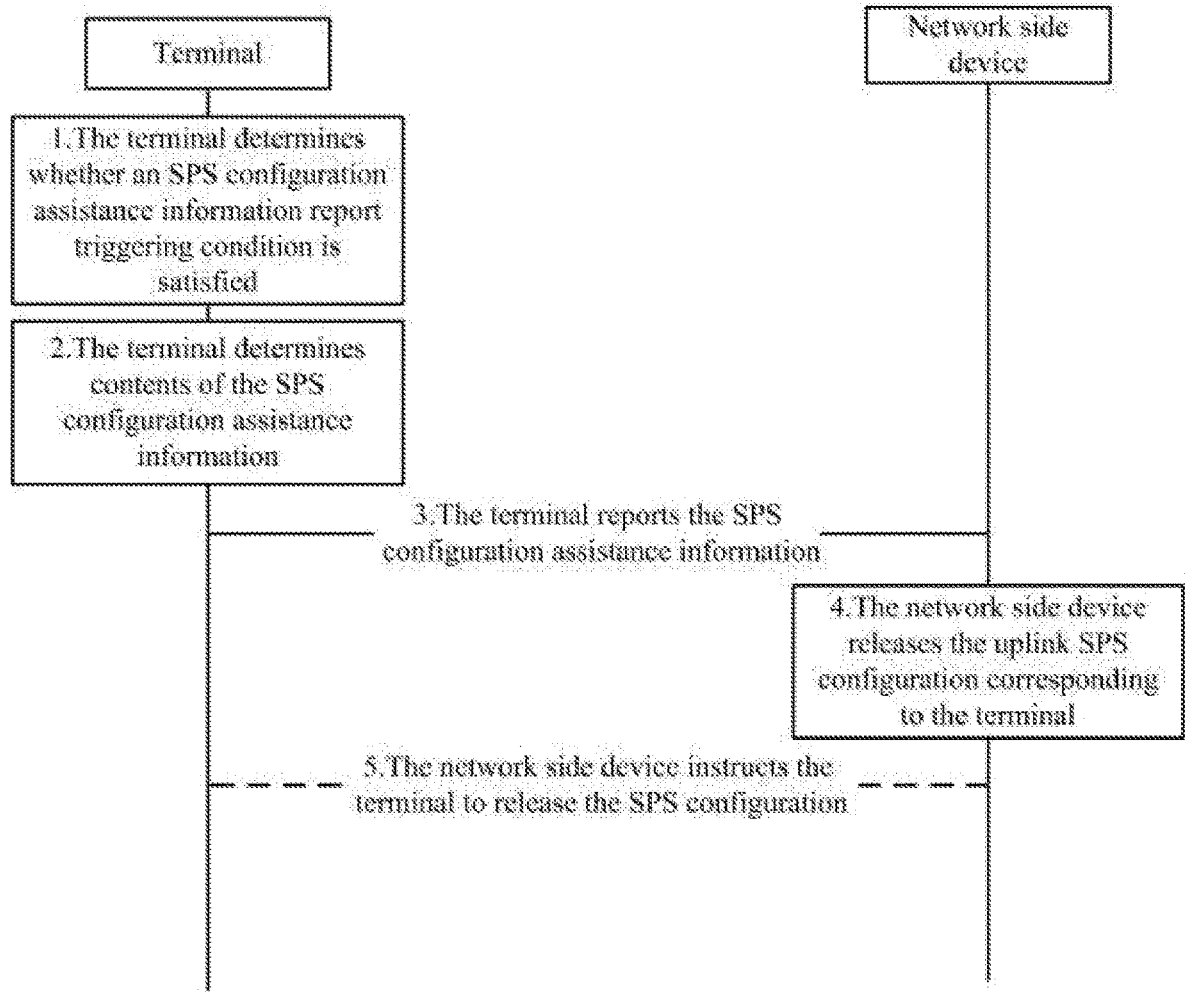
FIG. 10 is a schematic flow chart of a method for a network side device to release an SPS according to SPS configuration assistance information reported by a terminal according to an embodiment of the disclosure.

As illustrated by FIG. 10, the process of the network side device releasing an SPS configuration according to the SPS configuration assistance information reported by the terminal includes the following operations according to an embodiment of the disclosure.

Operation 1: The terminal determines whether an SPS configuration assistance information report triggering condition is satisfied.

The SPS configuration assistance information report triggering condition for releasing an SPS configuration is that a service using the uplink SPS is terminated or suspended.

Operation 2: The terminal determines contents of the SPS configuration assistance information.

If the UE supports a plurality of SPS configurations concurrently, then the SPS release instruction information includes information which can uniquely identify the SPS to be released, e.g., a part or all of an SPS C-RNTI, an SPS periodicity, or an SPS configuration number, corresponding to the uplink SPS to be released.

If the UE supports only one SPS configuration, then the conventional SPS releasing mechanism may be used.

Operation 3: The terminal reports the SPS configuration assistance information.

The terminal can report the SPS configuration assistance information to the network side device in RRC signaling, MAC signaling, or physical-layer signaling.

Operation 4: The network side device releases the uplink SPS configuration corresponding to the terminal.

The network side device releases the uplink SPS configuration corresponding to the terminal and corresponding to the SPS configuration assistance information according to the SPS configuration assistance information reported by the terminal. If the terminal has a plurality of SPS configurations concurrently, then the other SPS configurations are not be affected.

Operation 5: The network side device instructs the terminal to release the SPS configuration (an optional operation).

In the embodiments of the disclosure, the terminal transmits the SPS configuration assistance information to the network side device, so that the network side device configures the terminal with the uplink SPS information according to the received SPS configuration assistance information. Since the terminal can transmit the SPS configuration assistance information to the network side device, so that the network side device can configure the uplink SPS configuration with reference to the SPS configuration assistance information, the chance of mismatch between an uplink SPS resource and a corresponding service data packet's arrival time can be lowered to thereby shortening a waiting time for the service data packet to be transmitted after the service data packet's arrival and shortening latency of the service.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the disclosure can be further embodied in hardware and/or software (including firmware, resident software, microcodes, etc.). Still furthermore the disclosure can be embodied in the form of a computer program product on a computer useable or readable storage medium, where the computer program product includes computer useable or readable program codes embodied in the medium to be used by or in connection with an instruction executing system. In the context of the disclosure, the computer useable or readable medium can be any medium which can include, store, communicate, transmit, or transport program to be used by or in connection with an instruction executing system, apparatus or device.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

What is claimed is:

1. A method for configuring uplink Semi-Persistent Scheduling (SPS), comprising:
   determining, by a terminal, SPS configuration assistance information comprising determining, by the terminal, an uplink SPS resource start position desired by the terminal in a time domain as the SPS configuration assistance information;
   transmitting, by the terminal, the SPS configuration assistance information to a network side device.

2. The method according to claim 1, wherein determining, by the terminal, the SPS configuration assistance information further comprises:
   determining, by the terminal, a part or all of following information as the SPS configuration assistance information:
   an uplink SPS resource configuration periodicity desired by the terminal;
   data packet size indication information; and
   service type indication information.

3. The method according to claim 1, wherein:
   the SPS configuration assistance information is configured to activate the SPS, and the terminal determines the SPS configuration assistance information upon determining that a service needing to use an uplink SPS resource arrives; or
   the SPS configuration assistance information is configured to update an SPS configuration, and the terminal determines the SPS configuration assistance information upon determining that a waiting latency of each of N data packets exceeds a configured latency threshold under the SPS configuration, or upon determining that a service model of a service using the uplink SPS is changed, wherein N is a positive integer.

4. The method according to claim 1, wherein transmitting, by the terminal, the SPS configuration assistance information to the network side device comprises:
   transmitting, by the terminal, the SPS configuration assistance information to the network side device via Radio Resource Control (RRC) signaling, Media Access Control (MAC) signaling, or physical layer signaling.

5. The method according to claim 1, further comprising:
   transmitting, by the terminal, SPS release instruction information to the network-side device upon determining that a service using the uplink SPS is terminated or suspended.

6. The method according to claim 5, before transmitting the SPS release instruction information to the network-side device upon determining that the service using the uplink SPS is terminated or suspended, further comprising:
   putting an identifier of the uplink SPS to be released by the terminal in the SPS release instruction information if the terminal has a plurality of SPS resource configurations.

7. The method according to claim 6, wherein the identifier of the uplink SPS is one or a combination of:
   an SPS Cell Radio Network Temporary Identifier (C-RNTI), an SPS periodicity, and an SPS configuration number.

8. The method according to claim 1, after transmitting the SPS configuration assistance information to the network side device, further comprising:
   determining, by the terminal, SPS configuration numbers of each SPS according to a receiving order of uplink SPS information transmitted by the network side device; or
   determining, by the terminal, SPS configuration numbers of each SPS according to the SPS configuration numbers carried in uplink SPS information received from the network side device.

9. The method according to claim 1, after transmitting the SPS configuration assistance information to the network side device, further comprising:
   using, by the terminal, a parameter in the SPS configuration assistance information as an optional parameter in uplink SPS information after receiving the uplink SPS information transmitted by the network-side device and when the optional parameter is omitted in the uplink SPS information, wherein the used parameter in the SPS configuration assistance information and the omitted optional parameter in the uplink SPS information are parameters of a same kind.

10. A method for configuring uplink Semi-Persistent Scheduling (SPS), comprising:
    receiving, by a network side device, SPS configuration assistance information transmitted by a terminal, the SPS configuration assistance information comprises an uplink SPS resource start position desired by the terminal in a time domain; and
    configuring, by the network side device, the terminal with uplink SPS information according to the received SPS configuration assistance information.

11. The method according to claim 10, wherein the SPS configuration assistance information further comprises a part or all of following information:
    an uplink SPS resource configuration periodicity desired by the terminal;
    data packet size indication information; and
    service type indication information.

12. The method according to claim 10, wherein configuring, by the network side device, the terminal with the uplink SPS information according to the received SPS configuration assistance information comprises:
  determining, by the network side device, uplink SPS information desired by the terminal according to the received SPS configuration assistance information; and
  configuring, by the network side device, the terminal with the uplink SPS information according to the uplink SPS information desired by the terminal.

13. The method according to claim 12, wherein configuring, by the network side device, the terminal with the uplink SPS information according to the uplink SPS information desired by the terminal comprises:
  omitting, by the network side device, an optional parameter in the uplink SPS information corresponding to the terminal, wherein the omitted optional parameter in the uplink SPS information corresponding to the terminal and a parameter in the uplink SPS information desired by the terminal are the same; and
  configuring, by the network side device, the terminal with the uplink SPS information corresponding to the terminal after omitting the optional parameter.

14. The method according to claim 12, wherein configuring, by the network side device, the terminal with the uplink SPS information according to the uplink SPS information desired by the terminal further comprises:
  putting, by the network side device, an SPS configuration number of SPS in the uplink SPS information corresponding to the SPS.

15. A terminal, comprising a processor, a memory, and a transceiver, wherein,
  the processor, the memory, and the transceiver are connected via a bus;
  the memory stores preset computer instructions;
  the processor is configured to read the computer instructions in the memory to:
    determine SPS configuration assistance information comprising the processor configured to determine an uplink SPS resource start position desired by the terminal in a time domain as the SPS configuration assistance information; and
    control the transceiver to transmit the SPS configuration assistance information to a network side device; and
  the transceiver is configured to receive and transmit data under control of the processor.

16. The terminal according to claim 15, wherein the processor is further configured to determine a part or all of following information as the SPS configuration assistance information:
  an uplink SPS resource configuration periodicity desired by the terminal;
  data packet size indication information; and
  service type indication information.

17. The terminal according to claim 15, wherein:
  the SPS configuration assistance information is configured to activate the SPS, and the processor is further configured to determine the SPS configuration assistance information upon determining that a service needing to use an uplink SPS resource arrives; or
  the SPS configuration assistance information is configured to update an SPS configuration, and the processor is further configured to determine the SPS configuration assistance information upon determining that a waiting latency of each of N data packets exceeds a configured latency threshold under the SPS configuration, or upon determining that a service model of a service using the uplink SPS is changed, wherein N is a positive integer.

18. The terminal according to claim 15, wherein the processor is configured to:
  control the transceiver to transmit the SPS configuration assistance information to the network side device via Radio Resource Control (RRC) signaling, Media Access Control (MAC) signaling, or physical layer signaling.

19. The terminal according to claim 15, wherein the processor is further configured to:
  control the transceiver to transmit SPS release instruction information to the network-side device upon determining that a service using the uplink SPS is terminated or suspended;
  and/or put an identifier of the uplink SPS to be released by the terminal in the SPS release instruction information if the terminal has a plurality of SPS resource configurations wherein the identifier of the uplink SPS is one or a combination of:
    an SPS Cell Radio Network Temporary Identifier (C-RNTI), an SPS periodicity, and an SPS configuration number.

20. The terminal according to claim 15, wherein the processor is further configured to:
  determine SPS configuration numbers of each SPS according to a receiving order of uplink SPS information transmitted by the network side device; or
  determine SPS configuration numbers of each SPS according to the SPS configuration numbers carried in uplink SPS information received from the network side device; and/or
  use a parameter in the SPS configuration assistance information as an optional parameter in uplink SPS information after receiving the uplink SPS information transmitted by the network-side device and when the optional parameter is omitted in the uplink SPS information, wherein the used parameter in the SPS configuration assistance information and the omitted optional parameter in the uplink SPS information are parameters of a same kind.

* * * * *